(No Model.)
F. T. BALDWIN.
HOSE BAND.
No. 470,344.  Patented Mar. 8, 1892.
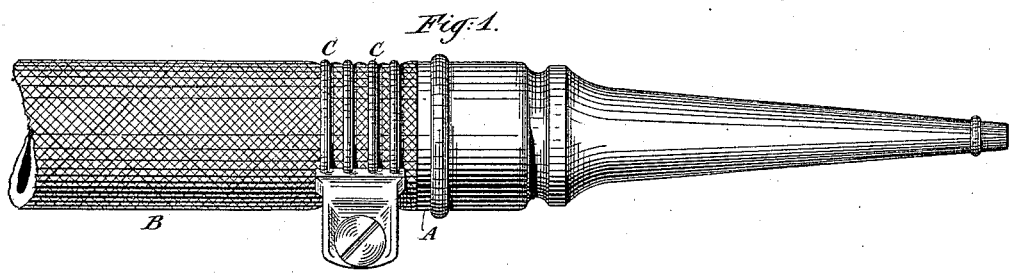
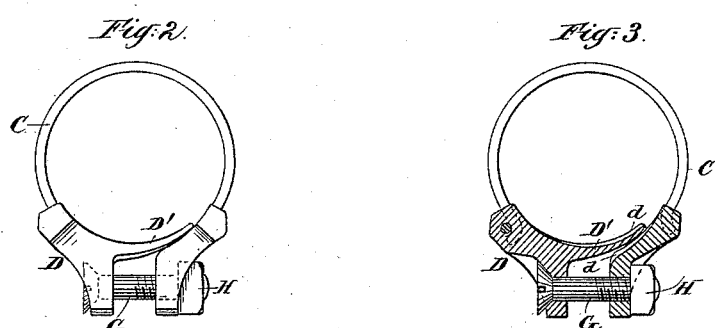
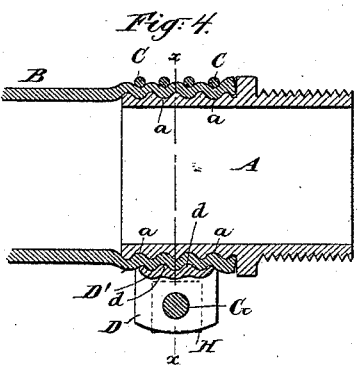
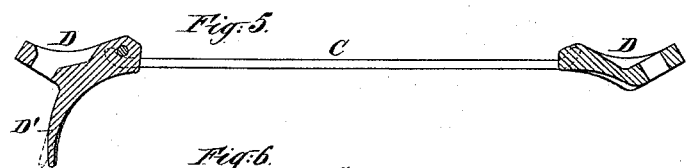
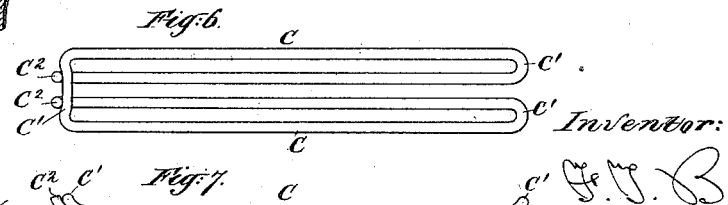
Witnesses:
Charles R. Searle
M. F. Boyle
Inventor:
F. T. Baldwin
by his attorney
Thomas Drew Stetson

UNITED STATES PATENT OFFICE.

FRANKLIN T. BALDWIN, OF BALDWINSVILLE, ASSIGNOR OF ONE-HALF TO RICHARD THOMPSON, OF NEW YORK, AND JOHN S. BUSHNELL, OF BROOKLYN, NEW YORK.

HOSE-BAND.

SPECIFICATION forming part of Letters Patent No. 470,344, dated March 8, 1892.

Application filed June 27, 1891. Serial No. 397,716. (No model.)

*To all whom it may concern:*

Be it known that I, FRANKLIN T. BALDWIN, of Baldwinsville, Onondaga county, in the State of New York, have invented a certain new and useful Improvement in Hose-Bands, of which the following is a specification.

My improved hose-band is adapted to serve in joining rubber or other hose to metallic couplings or analogous unyielding constructions. It is common to have the outer surface of the coupling corrugated circumferentially to obtain a better hold of the soft hose thereon and to have the hose just enough larger than the coupling to match upon its exterior with a gentle pressure thereon. The office of my hose-band is to apply on the exterior of the hose at that point and press the hose forcibly upon the exterior of the coupling, causing the soft material of the hose to engage in the circumferential grooves in the coupling and make a reliable and tight union. A common way to thus press the hose upon the coupling is by winding with wire, using a single wire of sufficient length and applying many coils thereof and twisting the ends. Efforts have been made to substitute therefor a clasp or band operated by a screw, so as to be easier of application, more reliable in holding, and especially easier of removal when such shall become necessary. My invention is an improvement in such bands. I have discovered that they may be made mainly of wire, with joining-pieces of cast metal, so that my clasp possesses the facility of application and removal pertaining to the band with the flexibility and capacity for pressing the hose into the grooves due to the employment of a series of separate and distinct wires. The screw engages and releases my clamp in the same manner as it engages and releases the cast-metal bands heretofore used or proposed, while the separate and distinct wires standing a little distance apart and firmly engaged with the end castings are capable of springing laterally enough to accommodate the positions of the circumferential grooves in the hose-coupling and force the soft rubber or other material of the hose certainly and fully into the grooves, allowing it to protrude to any extent required between the wires. My wire band may have any number of wires. I have in my experiments used four.

I have devised a construction whereby the four or other number of separate convolutions of the wire which extend around the hose as separate wires are manufactured from one continuous length and are kept united, the junction being made within the castings which serve as the joining means to receive the screw. This has the advantage of holding the wires to the castings reliably independent of the adhesion of the castings to the wires. I corrugate the interior faces of the castings to aid in engaging the hose with the grooves in the coupling; but the absence in those corrugations of the capacity for adjusting themselves apart and together possessed by my wires renders the corrugations of the castings of little effect. My wires, on the contrary, are certain to adapt themselves to the grooves under the strong contraction and free lateral adjustment, which is longitudinal relative to the hose, possessed by the wires. I extend a tongue from one of the castings across to lie within the casting on the other side of the gap and similarly corrugate the inner face of the tongue.

The following is a description of what I consider the best means of carrying out the invention.

The accompanying drawings form a part of this specification.

Figure 1 is an edge view showing the hose-band in use. Fig. 2 is a side view, or a view in the line of the axis, showing the hose-band detached from the hose. Fig. 3 is a section through the hose-band alone on the line $x\ x$ in Fig. 4. Fig. 4 is a central longitudinal section through the hose-band and through the hose and nozzle on which it applies when in use. Fig. 5 is a section corresponding to Fig. 3, but showing the hose-band extended and without the holding bolts and nuts. Fig. 6 represents the wires bent and ready to be placed in the mold to have the ends cast in place thereon, and Fig. 7 is another view of the same.

The same letters of reference indicate like parts in all the figures where they appear.

A is a portion of a hose-coupling, and $a\ a$ are the ordinary circumferential grooves thereon.

B is a portion of a length of hose to be united to and released from the coupling A, as required.

C and D are the wires and castings of my hose-band, certain parts of either being designated when necessary by supernumerals, as C'. Each wire C is joined to another similarly marked by a cross connection C' at one end, and the whole number of wires in one hose-clamp are formed from one piece of wire. I prefer that the wires shall be made of hard brass drawn in the ordinary manner. Each end is hooked upon a cross connection, the ends being marked $C^2\ C^2$. The castings D D are formed with internal corrugations $d\ d$, which tend to aid. One is formed with a tongue D', which extends across the joint between the ends of the clamp and performs the usual function of restraining the gushing out of the soft hose in the act of tightening the hose-band.

G is a screw, and H is a nut, which latter is recessed into one of the castings D. The screw is operated in the obvious manner to tighten and release the clamp.

The wires are bent into the positions in which they lie in the clamp or hose-band when the latter is extended, each wire being connected by a cross-wire C', which is a continuation of the same original wire, to another wire C, and the ends $C^2\ C^2$ are bent into the form of hooks and also engaged with a cross connection or cross-wire C'. The cross parts C' are lightly tinned, and the wires are then laid in the sand of the mold, with the bent and connected ends lying in the proper cavities provided to mold the castings, and the melted metal is poured to fill such cavities. If the casting adheres strongly, as by welding or soldering, to the wires, very well; but whether it adheres or not the wires are locked in the castings by their form and arrangement. They cannot be pulled out.

In packing, transporting, and storing the hose-bands they may lie extended. In use they become somewhat curved permanently, or they may do so without injury; but, owing to the fact that the main parts, those which embrace the hose and wires, give great flexibility and elasticity, it is easy to apply and remove my hose-bands. The union effected by my hose-band is strong and tight because of the hose being pressed into the grooves $a$ of the coupling A more completely than heretofore.

Modifications may be made by any good mechanic without departing from the principle or sacrificing the advantages of the invention. I can omit the corrugating of the inner faces of the castings D and tongue D'. I can omit the tinning of the parts of the wire which are to be united strongly to the castings. The end castings D serve an important end in receiving fairly the force of the screw and nut and allowing them to be easily turned to apply and relax the force.

It will be observed that the inner face of the tongue D' is the only part of the castings which is much presented to the hose when the band is fully compressed. The corrugating of this tongue contributes appreciably to the success of the device.

I claim as my invention—

1. The hose-band described, having wires C C extending nearly around the hose and capable of adjusting themselves to the grooves in the hose-coupling, the wires being joined by a portion C', so that all the wires are one continuous wire, in combination with a joining-casting D, bolt G, and nut H, arranged to serve as herein specified.

2. In a hose-clamp having wires C C extending nearly or quite around the hose, capable of adjusting themselves to the grooves in the hose-coupling or other tube or device on which the hose is to be used, the end castings D D, and the tongue D', the latter bridging across the interval between the castings, in combination with each other and with the bolt G and nut H, arranged for joint operation as herein specified.

In testimony that I claim the invention above set forth I affix my signature in presence of two witnesses.

FRANKLIN T. BALDWIN.

Witnesses:
E. Z. FRAZEE,
J. E. CONNELL.